(12) United States Patent
Martinsen et al.

(10) Patent No.: US 9,429,742 B1
(45) Date of Patent: Aug. 30, 2016

(54) HIGH POWER LASER IMAGING SYSTEMS

(75) Inventors: Robert J. Martinsen, West Linn, OR (US); Scott R. Karlsen, Battle Ground, WA (US); Scott A. Lerner, Portland, OR (US)

(73) Assignee: nLIGHT, Inc., Vancouver, WA (US)

( * ) Notice: Subject to any disclaimer, the term of this patent is extended or adjusted under 35 U.S.C. 154(b) by 873 days.

(21) Appl. No.: 13/486,896

(22) Filed: Jun. 1, 2012

Related U.S. Application Data

(63) Continuation-in-part of application No. 12/984,085, filed on Jan. 4, 2011, now Pat. No. 8,835,804.

(51) Int. Cl.
    G02B 17/08 (2006.01)
    G02B 17/06 (2006.01)
    B23K 26/06 (2014.01)

(52) U.S. Cl.
    CPC ....... *G02B 17/0812* (2013.01); *B23K 26/0643* (2013.01); *G02B 17/0615* (2013.01)

(58) Field of Classification Search
    CPC  G02B 16/06; G02B 17/065; G02B 17/0812; G02B 17/0816; G02B 17/0615; G02B 17/0621; B23K 26/0643; B23K 26/0656
    See application file for complete search history.

(56) References Cited

U.S. PATENT DOCUMENTS

| | | | |
|---|---|---|---|
| 3,748,015 A * | 7/1973 | Offner | 359/366 |
| 4,293,186 A * | 10/1981 | Offner | G02B 17/008 359/366 |
| 4,377,339 A | 3/1983 | Coppock | |
| 4,492,427 A | 1/1985 | Lewis et al. | |
| 4,688,904 A * | 8/1987 | Hirose | G02B 17/008 359/729 |
| 4,711,535 A * | 12/1987 | Shafer | G02B 17/008 359/649 |
| 4,932,747 A | 6/1990 | Russell et al. | |
| 5,153,773 A | 10/1992 | Muraki et al. | |
| 5,224,200 A | 6/1993 | Rasmussen et al. | |
| 5,517,359 A | 5/1996 | Gelbart | |
| 5,586,132 A | 12/1996 | Levy | |
| 5,619,245 A | 4/1997 | Kessler et al. | |
| 5,638,220 A * | 6/1997 | Ohtomo et al. | 359/739 |
| 5,673,135 A * | 9/1997 | Yoshino | G02B 17/008 359/196.1 |
| 5,719,704 A | 2/1998 | Shiraishi et al. | |
| 5,936,761 A | 8/1999 | Kubota et al. | |
| 6,040,553 A | 3/2000 | Ross | |
| 6,114,088 A | 9/2000 | Wolk et al. | |

(Continued)

FOREIGN PATENT DOCUMENTS

| JP | 05-277776 A | * 10/1993 |
|---|---|---|
| JP | 2000-343257 A | * 12/2000 |

(Continued)

OTHER PUBLICATIONS

Machine translation of Japan Patent document No. 2000-343,257, Nov. 2015.*

(Continued)

*Primary Examiner* — Geoffrey S Evans
(74) *Attorney, Agent, or Firm* — Klarquist Sparkman, LLP

(57) ABSTRACT

An imaging system for use with an input light beam having power of 2 kW or greater and a predetermined intensity profile across at least on axis transverse to a propagation axis thereof, includes a mask disposed in relation to the input light beam, the mask configured to direct selected portions of the input light beam, and an optical relay disposed in relation to the mask and configured to reflectively direct the selected portions of the input light beam to a target.

35 Claims, 5 Drawing Sheets

(56) References Cited

U.S. PATENT DOCUMENTS

| | | | |
|---|---|---|---|
| 6,169,565 B1 | 1/2001 | Ramanujan et al. | |
| 6,498,680 B1 | 12/2002 | Zhou | |
| 6,509,547 B1 | 1/2003 | Bernstein et al. | |
| 6,529,542 B1 | 3/2003 | Karlsen et al. | |
| 6,531,681 B1* | 3/2003 | Markle et al. | 219/121.8 |
| 6,560,039 B1* | 5/2003 | Webb et al. | 359/731 |
| 6,618,174 B2 | 9/2003 | Parker et al. | |
| 6,678,308 B1* | 1/2004 | Matthews | 372/98 |
| 6,707,532 B2* | 3/2004 | Suzuki | G02B 17/008 355/52 |
| 6,873,398 B2 | 3/2005 | Sievers | |
| 6,980,295 B2 | 12/2005 | Lerner | |
| 6,985,226 B2 | 1/2006 | Lerner | |
| 7,006,217 B2 | 2/2006 | Lerner | |
| 7,158,215 B2* | 1/2007 | Harned | G02B 17/061 345/12 |
| 7,167,630 B2 | 1/2007 | Eyal et al. | |
| 7,253,376 B2* | 8/2007 | Zhang et al. | 219/121.73 |
| RE39,846 E | 9/2007 | Tanitsu et al. | |
| 7,277,229 B2 | 10/2007 | Kato | |
| 7,293,882 B2 | 11/2007 | Lerner et al. | |
| 7,317,469 B2 | 1/2008 | Kim et al. | |
| 7,355,800 B2 | 4/2008 | Anikitchev | |
| 7,418,172 B2 | 8/2008 | Tanaka et al. | |
| 7,502,537 B2 | 3/2009 | Kurahashi | |
| 7,519,493 B2 | 4/2009 | Atwell et al. | |
| 7,545,403 B2 | 6/2009 | Kang et al. | |
| 7,545,446 B2 | 6/2009 | Lerner et al. | |
| 7,704,666 B2 | 4/2010 | Noh et al. | |
| 7,745,991 B2 | 6/2010 | Yamazaki et al. | |
| 7,776,493 B2 | 8/2010 | Kang et al. | |
| 7,792,249 B2 | 9/2010 | Gertner et al. | |
| 7,821,718 B1 | 10/2010 | Govyadinov et al. | |
| 7,847,940 B2 | 12/2010 | Karasyuk et al. | |
| 7,851,725 B2 | 12/2010 | Dane et al. | |
| 7,885,012 B2 | 2/2011 | Reynolds | |
| 7,892,382 B2 | 2/2011 | Bellmann et al. | |
| 7,995,298 B2 | 8/2011 | Chen | |
| 8,062,986 B2 | 11/2011 | Khrapko et al. | |
| 8,483,533 B1 | 7/2013 | Mehl | |
| 8,821,963 B2 | 9/2014 | Tanaka et al. | |
| 2003/0016450 A1 | 1/2003 | Bluemel et al. | |
| 2003/0128543 A1 | 7/2003 | Rekow | |
| 2004/0036961 A1 | 2/2004 | McGuire | |
| 2004/0065646 A1 | 4/2004 | Halpin | |
| 2004/0090609 A1 | 5/2004 | Komatsuda | |
| 2004/0223330 A1 | 11/2004 | Broude et al. | |
| 2005/0045604 A1* | 3/2005 | Talwar et al. | 219/121.65 |
| 2005/0098260 A1 | 5/2005 | Chen | |
| 2006/0012842 A1 | 1/2006 | Abu-Ageel | |
| 2006/0102605 A1 | 5/2006 | Adams et al. | |
| 2006/0176912 A1 | 8/2006 | Anikitchev | |
| 2006/0246693 A1 | 11/2006 | Tanaka et al. | |
| 2007/0063226 A1* | 3/2007 | Tanaka et al. | 257/213 |
| 2007/0147065 A1 | 6/2007 | Nagata | |
| 2007/0153847 A1* | 7/2007 | Faircloth et al. | 372/35 |
| 2008/0025732 A1 | 1/2008 | Hattori | |
| 2008/0210671 A1 | 9/2008 | Jennings et al. | |
| 2008/0308534 A1* | 12/2008 | Li et al. | 219/121.8 |
| 2009/0127477 A1 | 5/2009 | Tanaka | |
| 2009/0219491 A1 | 9/2009 | Williams et al. | |
| 2009/0236495 A1 | 9/2009 | Jennings et al. | |
| 2010/0048036 A1 | 2/2010 | Tanaka et al. | |
| 2010/0097680 A1 | 4/2010 | Naftali et al. | |
| 2010/0140478 A1 | 6/2010 | Wilson et al. | |
| 2010/0171931 A1 | 7/2010 | Kessler | |
| 2010/0254717 A1 | 10/2010 | Miller | |
| 2011/0043900 A1* | 2/2011 | Bayramian | G02B 27/0944 359/349 |
| 2012/0045169 A1 | 2/2012 | Hu | |
| 2012/0057345 A1 | 3/2012 | Kuchibhotla | |
| 2012/0069861 A1 | 3/2012 | Neuberger | |
| 2012/0248078 A1 | 10/2012 | Zediker et al. | |
| 2012/0268836 A1* | 10/2012 | Mercado | G02B 17/0852 359/731 |
| 2012/0273269 A1 | 11/2012 | Rinzler et al. | |
| 2013/0058092 A1 | 3/2013 | Anisimov | |
| 2013/0107360 A1* | 5/2013 | Kurtz | G02B 1/00 359/434 |

FOREIGN PATENT DOCUMENTS

| | | |
|---|---|---|
| JP | 2006-278491 A * | 10/2006 |
| WO | WO 2011/142849 | 11/2011 |

OTHER PUBLICATIONS

International Search Report and Written Opinion for International Application No. PCT/US2013/033424, 9 pages, mailed Jul. 18, 2013.

Positive Light, Inc. "Relay Imaging in Rod Amplifier Systems," Technical Bulletin, 2 pages, (May 2002) (copy attached).

Schmitt et al., "Illumination uniformity of laserfusion pellets using induced spatial incoherence," *Journal of Applied Physics*, vol. 60(1), pp. 6-13 (Jul. 1, 1986) (copy attached).

Erdmann et al., "Coherence management for microlens laser beam homogenizers," Proceedings of SPIE, 4775:145-154 (Aug. 2002).

Summary of First Office Action from the State Intellectual Property Office of the People's Republic of China for Chinese App. No. 201380012279.9, mailed Oct. 26, 2015, 4 pages.

French et al., "Absorption Edge and Band Gap of SiO2 Fused Silica Glass," Ceramic Transactions, 28:63-80 (1992).

* cited by examiner

HIGH POWER LASER IMAGING SYSTEMS

CROSS-REFERENCE TO RELATED APPLICATION

This application is a continuation-in-part of application Ser. No. 12/984,085 filed Jan. 4, 2011 now U.S. Pat. No. 8,835,804, which is incorporated here by reference in its entirety.

BACKGROUND OF THE INVENTION

1. Field of the Invention

Generally, the field of the present invention is high power laser systems. More particularly, the present invention relates to high power laser systems with high accuracy requirements.

2. Background

Advances in semiconductor lasers permit manufacturers to offer increasingly higher laser powers at a variety of wavelengths for a wide variety of applications. Typical applications of semiconductor lasers include materials processing, communications systems, medical devices, lighting, and analytical instrumentation. In many applications, to provide even higher optical powers, outputs from multiple devices are combined using combinations of lenses, mirrors, bulk beamsplitters, and fused fiber couplers. In many cases, laser beams produced by semiconductor lasers are not circular but elliptical, and typically have differing beam waists based on the elongated shape of the laser emission area.

Some applications impose difficult requirements on beam uniformity and delivery. While considerable effort has been directed to combining laser outputs to produce uniform beams that are accurately delivered, the available systems nevertheless continue to exhibit some significant limitations. Thus, despite the considerable efforts that have been exerted for many years, there remains a need for laser systems that provide high power and highly accurate optical beams for various applications.

SUMMARY OF THE INVENTION

To satisfy the aforementioned need various aspects and features of the present invention provide innovations directed to laser imaging systems suitable for various high power high precision applications. According to one aspect of the present invention, an imaging system for use with an input light beam having power of 2 kW or greater and a predetermined intensity profile across at least on axis transverse to a propagation axis thereof, includes a mask disposed in relation to the input light beam, the mask configured to direct selected portions of the input light beam, and an optical relay disposed in relation to the mask and configured to reflectively direct the selected portions of the input light beam to a target.

According to another aspect of the present invention, a method of processing materials with an optical beam of 2 kW or greater generated by one or more laser sources, includes directing an object optical beam generated by the one or more laser sources towards a reflective optical relay, reflecting the optical beam through the reflective optical relay, and imaging the optical beam at unit magnification at a work surface.

Additional features and advantages of the present invention will be apparent from the following detailed description of preferred embodiments thereof, which proceeds with reference to the accompanying drawings, which are not necessarily drawn to scale.

DETAILED DESCRIPTION OF THE INVENTION

Figure 1:
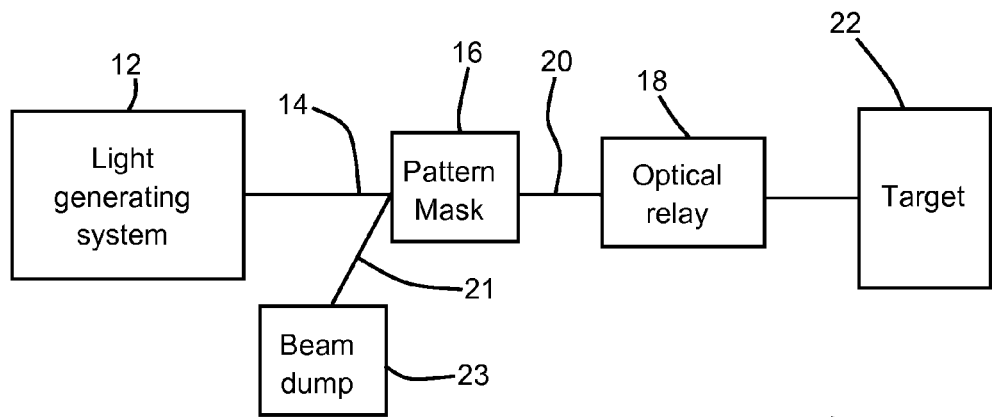
FIG. 1 is a block diagram showing a high power imaging system according to an aspect of the present invention.
Figure 2:
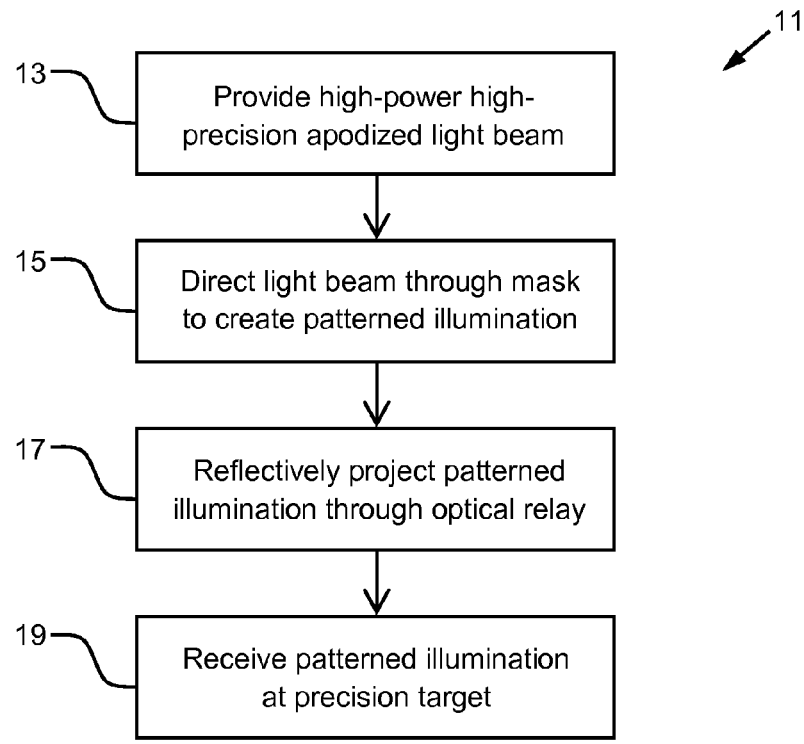
FIG. 2 is a flow-chart diagram showing an exemplary method according to an aspect of the present invention.

Referring now to FIG. 1, a block diagram shows basic aspects of an embodiment of an imaging system 10 providing very high power light in a very accurate manner for materials processing and the like in accordance with the present invention. The imaging system 10 generally includes a light generating system 12 providing an input optical beam 14 at one or more suitable wavelengths, e.g., less than 2 μm, directed to a pattern mask 16, optical relay 18, and target 22. With additional reference to FIG. 2, an exemplary method 11 is shown in flow-chart form. The input optical beam 14 provided by the light generating system 12, for example, as shown in block 13, is directed to the pattern mask 16 and the mask 16 allows at least some selected portion 20 of the input optical beam 14 to be transmitted therethrough towards the optical relay 18, for example, as shown in block 15. In some examples the portion 20 of the input optical beam 14 that is transmitted is substantially all of the beam 14 while in others the portion 20 that is transmitted is less than substantially all of the beam 14, such as 2%, 10%, 50%, or other percentages of the input beam 14. In preferred examples the power of the input optical beam 14 is very high, such as 2 kW or more and the beam 14 is provided at a focus thereof in a very small well-defined area, such as a thin rectangle, or line, having dimensions of 250 mm by 1 mm, though other lengths, widths, and aspect ratios are possible. In some examples the input beam 14 has a power of 5 kW, 10 kW, 15 kW, or even 20 kW or greater and the area in which the beam 14 is provided can be larger, with exemplary rectangular dimensions increasing to or exceeding 750 mm by 1 mm. In some embodiments the imaging system 10 is sufficiently modular that it includes pattern mask 16 and optical relay 18 disposed in relation to each other without the presence of target 22 and light generating system 12. However, in other embodiments the imaging system 10 includes the pattern mask 16 and optical relay 18 together with the light generating system 12 or the target 22 or both. In some embodiments light generated system 12 includes a plurality of diode laser modules which are optically coupled to optical fiber. In still other embodiments the beams are coupled into one or more beam homogenizers capable of homogenizing and providing the beams as an input beam 14 with a predetermined intensity profile.

Optical relay 18 receives the transmitted optical beam 20 and reflectively directs, or relays, the beam 20 with high precision and low aberration to target 22, for example, as shown in blocks 17 and 19. In some embodiments, the numerical aperture of the relayed beam is 0.1 or less across a first axis transverse to the direction of propagation, and approximately 0.01 across a second axis transverse to the direction of propagation. Some examples provide beams 20 projected with a field curvature of less than 500 µm while other examples field curvatures of 50 µm or less are achieved. In some embodiments the telecentricity of the transmitted beam 20 is less than 40 mrad while in other embodiments telecentricity is less than 4 mrad. One suitable target 22 for the transmitted beam 20 in imaging system 10 is a laser induced thermal imaging (LITI) target which is configured to receive the beam 20 so that thermal imaging can occur. A variety of surfaces may be targeted, though typically beams are directed to a LITI donor film comprised of a base film, a light to heat conversion layer, and a transfer layer, such as an electroluminescent layer made of small molecules or light emitting polymer. Ultra fast heating caused by the selected incidence of laser radiation on the donor film transfers the electroluminescent layer onto to an adjacent substrate. Such selective material transfer can be used for pixel formation in various display technologies, such as organic LED manufacture, and is achievable with higher efficiency than other techniques by using lasers and systems described herein which exhibit high accuracy and precision. To satisfy such heightened requirements, particularly at higher powers, numerous problems are encountered which are solved by the many innovative aspects of the present invention.

Figure 3:
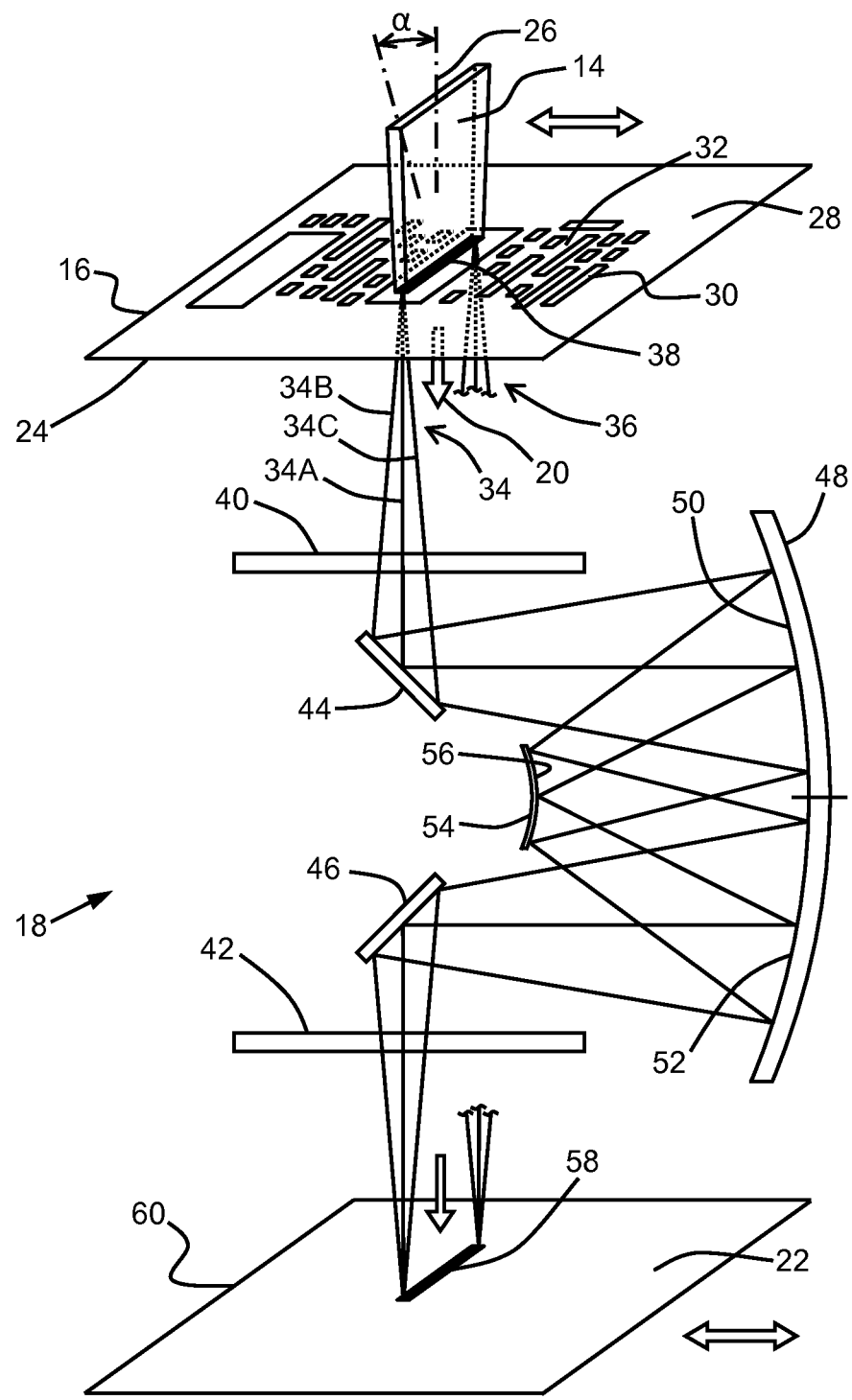
FIG. 3 is a combined perspective and cross-sectional view of an imaging system according to an aspect of the present invention, incorporating one embodiment of an optical relay.

In reference to FIGS. 1 and 3, the mask 16 is shown disposed in relation to an object plane 24, or focus, of the input light beam 14 propagating along a propagation axis 26. The mask 16 includes a thickness that is generally thin, typically ranging several microns to a few millimeters, compared to length and width dimensions which define a planar surface 28 thereof. While the planar surface 28 is generally preferred to be flat, in some embodiments the surface 28 may have contour that is other than flat. The positional relationship between the mask 16 and beam 14 is generally defined such that propagation axis 26 of beam 14 is perpendicular to the surface 28 of the mask 16. In some embodiments, the mask 16 may be arranged at an angle α with respect to the perpendicularly arranged propagation axis 26 such that the propagation axis 26 is not perpendicular to the mask 16. During operation of the light generating system 12 the mask 16 is typically fixed such that the transmitted beam 20 has a constant shape and profile. When the light generating system 12 is not energized the mask 16 may be moved laterally so that a different patterned portion 30 is provided for an input beam 14 so that a different transmitted beam 20 is produced during subsequent operation. The mask 16 may also be adjusted rotationally and vertically for optimal performance, during or prior to operation.

Mask 16 typically includes one or more patterned portions 30 that transmit at the wavelength of the beam 14 so that portions of beam 14 may propagate past mask 16. By way of example, the patterned portions 30 can include holes or perforations in the mask 16 or areas upon which no reflective coating is applied. Accordingly, in some embodiments non-patterned areas 32 can include regions where reflective coating is applied. Thus, as input beam 14 is incident upon the surface 28, a transmitted beam 20 is formed where portions of input beam 14 are allowed to propagate through patterned portions 30 while other portions of the beam 14 are reflected or otherwise not allowed to propagate through the mask 16. A beam dump 23 may be disposed in relation to the mask 16 such that reflected light 21 at the mask 16, i.e., the non-transmitted portions of the beam 14, may be optically coupled to the dump 23. The angle α that can be defined between a perpendicularly arranged propagation axis allows the non-transmitted portions of the beam 14 to be reflected away from the propagation axis 26 of the beam 14 instead of backwards therealong, thereby preventing potential damage to one or more components of the imaging system 10, including components of the light generating system 12. In some embodiments, mask 16 is instead a diffractive, reflective, or absorptive mask. However, more generally, mask 16 is configured to filter and provide an input beam 20 through one or more conventional techniques. Moreover, in some embodiments mask 16 can be patterned to account for distortion or aberrations in relay 18, particularly for multi-mirror embodiments such as four-mirror embodiments.

As was discussed hereinbefore, in some embodiments the input light beam 14 is focused to a narrow aspect rectangle, or line. The transmitted portion 20 begins to diverge after propagating past the mask 16 and object plane 24. To effectively process different materials or targets before beam divergence adversely affects processing, the target 22 would need to be disposed in close relation to the object plane 24. This proximity causes various engineering problems that are largely difficult to directly overcome, especially for advanced applications which typically have heightened accuracy requirements and require high power. Included among these problems is a very narrow range for a working distance between the mask 16 and target 22. The short working distance can in turn cause other problems, such as difficulties associated with thermal management, potential damage to the mask, tooling design, etc.

In order to overcome the narrow working distance, the transmitted beam 20 is directed through optical components that allow the imaging of the beam 20 at a location separate from the mask 16. Typically, various laser systems, including high power laser systems, direct a focused beam through a refractive lens system which refocuses the beam at a separate location, thereby providing additional working distance. The lens system may also provide aberration correction and magnification. However, as beam requirements increase, the limits of refractive lens systems become more apparent. Referring to the general diagram of FIG. 1, by incorporating significant reflective portions into optical relay 18, the heightened requirements of complex laser systems, including but not limited to high power line generators, can be met. For example, working distances of 0.5 m or greater can be achieved in some embodiments. By including reflective aspects, catoptric as well as catadioptric relays can be used, including Offner and Dyson designs.

Referring back to FIG. 3, the divergent path of the transmitted portion 20 of the beam propagating past the mask 16 is shown generally for exemplary rays 34, 36 near opposite lengthwise ends of a laser line object 38 at object plane 24. Marginal rays 34B, 34C of ray 34 diverge from principal ray 34A as the transmitted portion 20 propagates on towards optical relay 18. The propagation of ray 36 through relay 18 is omitted for clarity. Optical relay 18 is illustrated in FIG. 3 as a reflective relay, may be one similar to those disclosed in U.S. Pat. No. 3,748,015 to Offner, which is incorporated herein by reference.

Figure 6:
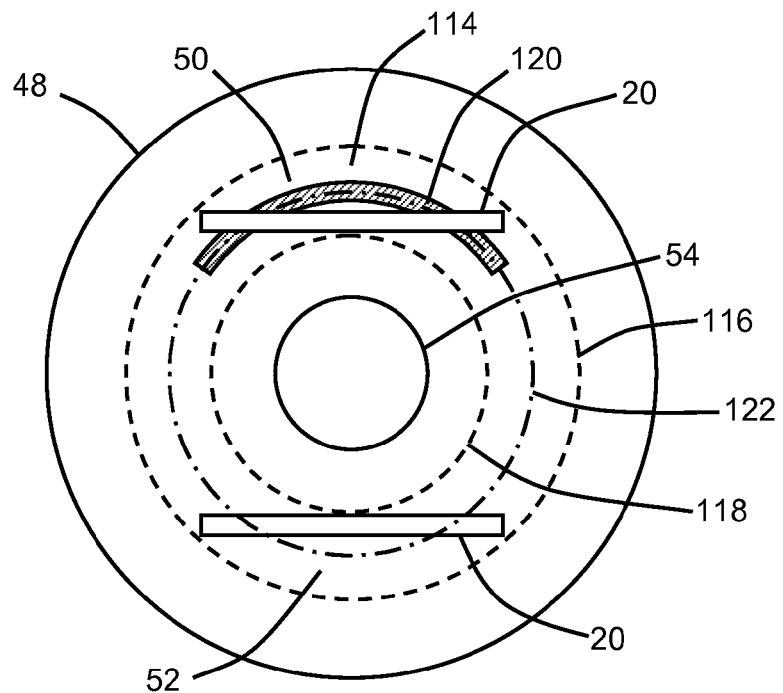
FIG. 6 is a side view of the optical relay in FIG. 3 or 4 in accordance with an aspect of the present invention.

In one embodiment, optical relay 18 includes a pair of transmissive windows 40, 42 defining a respective beam inlet and outlet thereof, a pair of reflective turning mirrors 44, 46, a concave mirror 48 having a reflective surfaces 50, 52 for respectively receiving the transmitted beam 20 from and directing the beam 20 towards the respective turning mirrors 44, 46, and a convex mirror 54 having a reflective surface 56 and positioned in relation to the concave mirror 48 so that the beam reflected off surface 50 is convergently received and divergently reflected towards surface 52. Concave mirror 48 may include reflective surfaces, such as surfaces 50, 52, that are separate and spaced apart from each other or the surfaces may be formed in one piece. With additional reference to FIGS. 6 and 7, in the Offner design the respective concave and convex reflective surfaces are spherical and concentrically disposed about a common origin, resulting in a generally superior image quality over a rotationally symmetric ring field 114 of the relay 18, and resulting in unit magnification with automatic correction for all primary aberrations. In some embodiments magnifications other than unit magnification are produced. For example, a four mirror system may be used to produce four times unit magnification. The ring field 114 generally shows where the imaging relay 18 provides a concentric region of focus and reduced aberration. For example, lines 116, 118 of constant aberration are similarly concentric and provide general boundaries for the ring field 114. A cross-hatched region 120 of superior focus is shown about a central line 122 of best focus and aberration.

Figure 7:
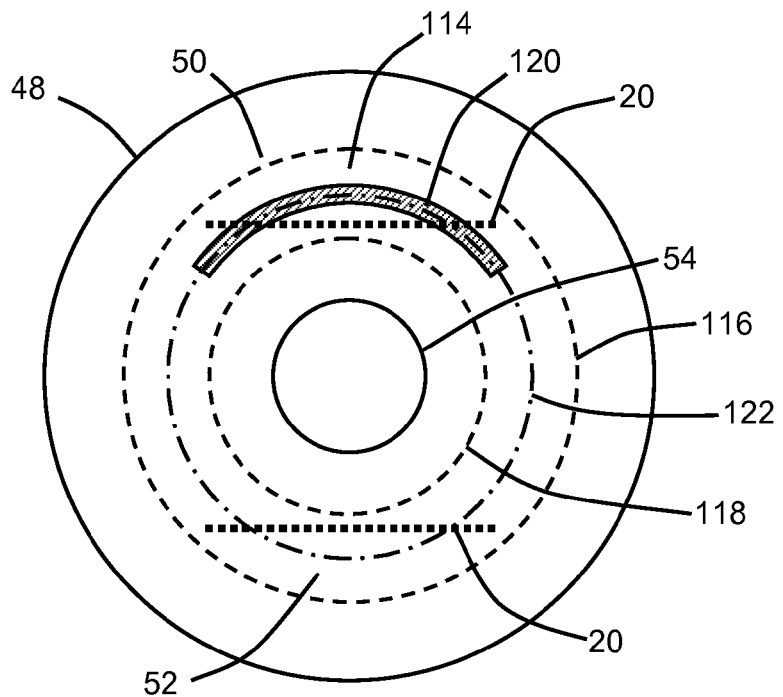
FIG. 7 is another side view of the optical relay in FIG. 3 or 4 in accordance with an aspect of the present invention.

Ray 34 reflects off second turning mirror 46 and out through transmissive window 42 towards a convergent focus forming a laser line image 58 at an image plane 60, which is generally coincident with target 22. The turning mirrors 44, 46 are positioned in the relay 18 so as to provide a co-linear projection from object 38 to image 58, typically oriented at 45° with respect to the incident beam 20. Previously omitted ray 36 is shown convergently propagating towards image plane 60 after second window 42. The optical path distance between the object 38 and the reflective surface 50 of the concave mirror 48 is nominally twice the path length from either one of the surfaces 50, 52 to the convex mirror 54. FIG. 7 shows a similar depiction as FIG. 6 except that a different transmitted portion 20 of the input light beam 14 is shown incident on the concave mirror 48.

Figure 4:
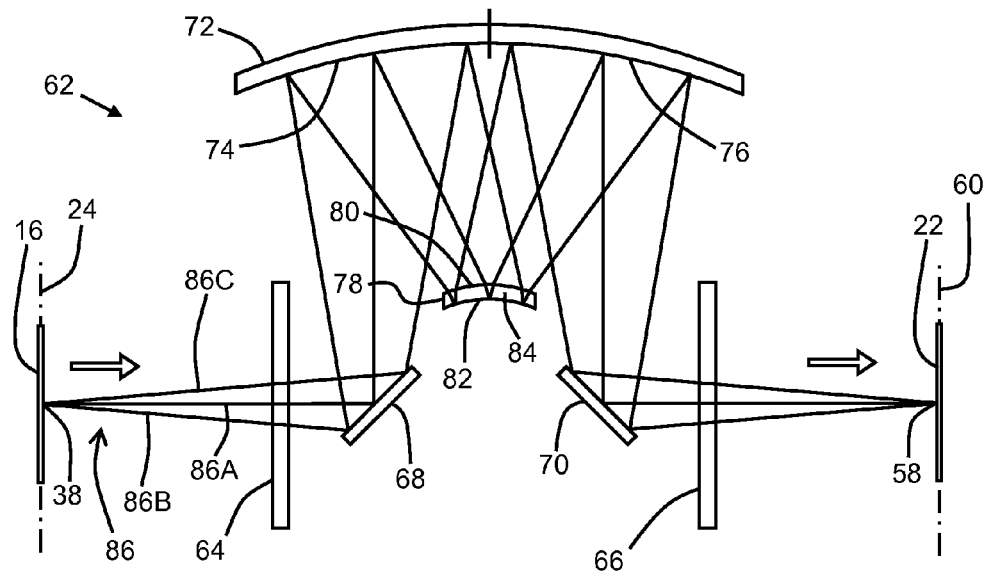
FIG. 4 is a cross-sectional view of another embodiment of an optical relay in accordance with another aspect of the present invention.

Referring now to the cross-sectional view of FIG. 4, in another embodiment, an optical relay 62 includes a pair of transmissive windows 64, 66 forming a general inlet and outlet for a light beam entering and exiting the relay 62, a pair of reflective planar turning mirrors 68, 70, an aspheric concave mirror 72 having a reflective surfaces 74, 76 for respectively receiving the transmitted beam 20 from and directing the beam 20 towards the respective turning mirrors 68, 70, and a convex mirror 78 positioned in relation to the concave mirror 72 so that the beam reflected off surface 74 is convergently received and divergently reflected towards surface 76. Convex mirror 78 includes a refractive first surface 80, a reflective second surface 82 and an interior portion 84, allowing a beam incident on first surface 80 to refract through interior portion 84, reflect at second surface 82, and to propagate through interior portion 84 and out first surface 80.

An example ray 86, which includes principal ray 86A and corresponding marginal rays 86B, 86C propagates through relay 62 from an initial starting point at the object plane 24. The ray 86 passes through window 64, reflects off turning mirror 68, and is directed towards first aspheric surface 74 of concave mirror 72. Ray 86 reflects off surface 74 and is directed towards convex mirror 78 where it refracts through first surface 80 of convex mirror 78 and propagates through the interior region 84 thereof before reflecting off second surface 82 back towards first surface 80 and out divergently towards second surface 76 of aspheric concave mirror 72. Ray 86 reflects off second surface 76 and convergently propagates towards second turning mirror 70 which causes the ray 86 to reflect and continue convergently propagate through second transmissive window 66 towards image plane 60. The turning mirrors 68, 70 are positioned in the relay 62 so as to provide a co-linear projection from object plane 24 to image plane 60. In some embodiments the projection is other than co-linear. The addition of the refractive first surface 80 to convex mirror 78 provides correction for optical aberrations, including astigmatism. The aspheric aspect of the surfaces 74, 76 of the concave mirror further improves image quality. The orientation of the turning mirrors 68, 70 can vary from 45° orientation with respect to the incident beam 20 in order to maintain the aforementioned co-linearity as well as telecentricity of the image and object. In some embodiments the path length between the object 38 and reflective surface 74 or between surface 76 and image 58, and the path length between surface 74 and convex mirror 78 is a ratio that is less than two, and in some examples significantly less than two.

Figure 5:
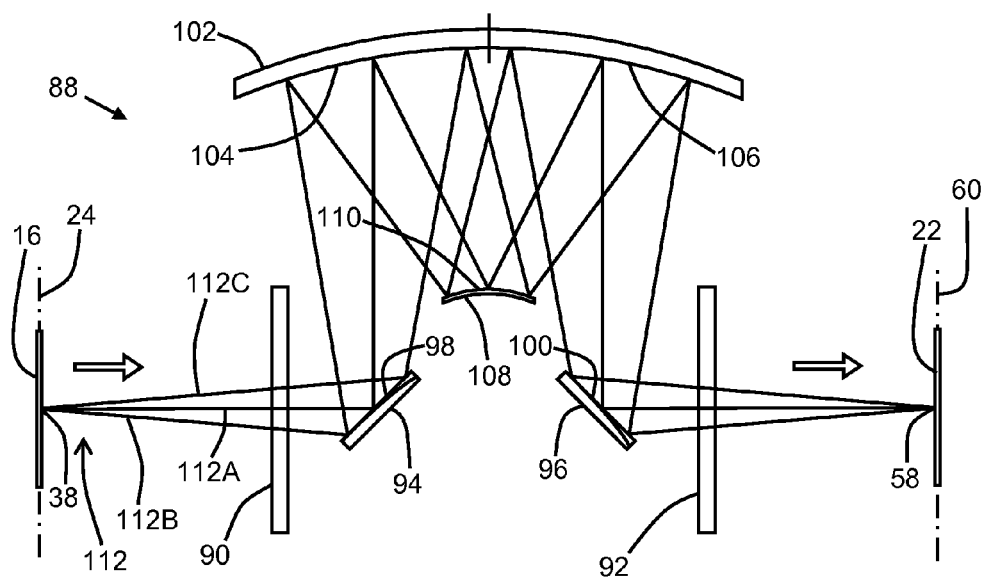
FIG. 5 is a cross-sectional view of still another optical relay in accordance with another aspect of the present invention.

In another embodiment, referring now to the cross-sectional view of FIG. 5, an optical relay 88 includes a pair of transmissive windows 90, 92 forming a general inlet and outlet for a light beam entering and exiting the relay 88, a pair of reflective turning mirrors 94, 96 having respective bilaterally symmetric aspheric surfaces 98, 100, a concave mirror 102 having a reflective surfaces 104, 106 for respectively receiving the transmitted beam 20 from and directing the beam 20 towards the respective turning mirrors 94, 96, and a convex mirror 108 having a reflective surface 110 and positioned in relation to the concave mirror 102 so that the beam reflected off surface 104 is convergently received and divergently reflected towards surface 106. In some embodiments, concave and convex mirrors 102, 108 are disposed about a common origin while in others mirrors 102, 108 are not concentrically disposed about a common origin. An example ray 112, which includes principal ray 112A and corresponding marginal rays 112B, 112C propagates through relay 88 from an initial starting point at the object plane 24. The ray 112 pass through window 90, reflects off turning mirror 94, and is directed towards surface 104 for reflection thereat and towards convex mirror 108. Ray 112 reflects at mirror 108 and is directed towards surface 106 of concave mirror 102. Ray 112 reflects at surface 106 and is convergently directed towards second turning mirror 96 and reflects off the surface thereof and propagates out transmissive window 92 convergently towards image plane 60.

Figure 8:
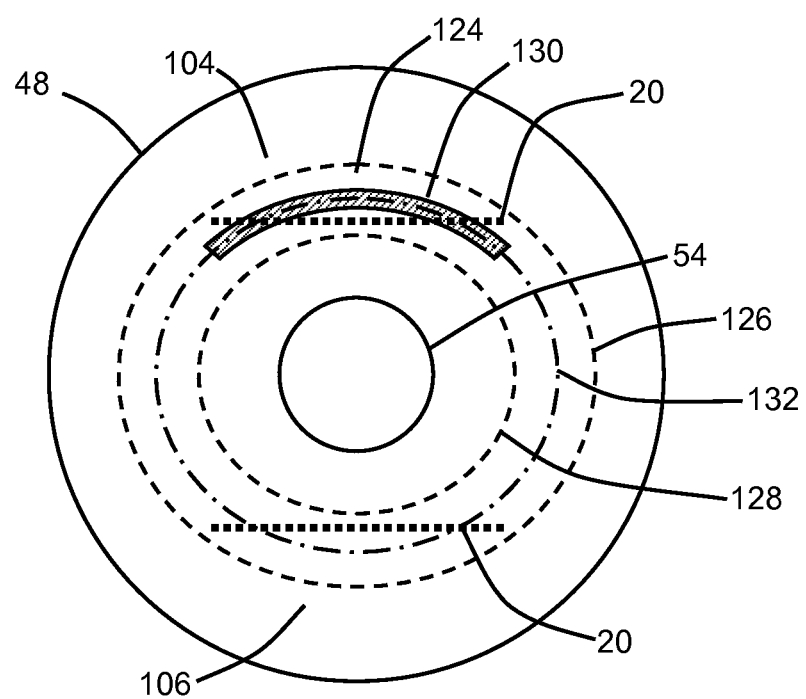
FIG. 8 is a side view of the optical relay in FIG. 5 in accordance with an aspect of the present invention.

The turning mirrors 94, 96 are positioned in the relay 88 so as to provide a co-linear projection from object plane 24 to image plane 60. In some embodiments the projection is other than co-linear. The turning mirrors 94, 96 can vary from a 45° orientation with respect to the incident beam 20 in order to maintain the aforementioned co-linearity as well as telecentricity of the image and object. The respective surfaces 98, 100 of the turning mirrors 94, 96 can be described by off-axis sections of a bilaterally symmetric polynomial such that the surfaces 98, 100 are mirror images of each other. There are many suitable solutions, and corresponding embodiments, for the shape of the surfaces 98, 100 which give superior performance. In some embodiments the surfaces 98, 100 are described by an off-axis section of a rotationally symmetric asphere, or a conic. In still other embodiments, the surfaces 104, 106 of the concave mirror 102 are aspheric. With additional reference to FIG. 8, a ring field 124 is shown for one optical configuration of relay 88. Ring field 124 includes lines of constant aberration 126, 128 which bound a central line 132 of best focus and aberration. A cross-hatched region 130 of superior focus is shown in relation to the reflected beam 20. The lines 126, 128, 132 as well as region 130 are nominally bilaterally symmetric though not rotationally symmetric. In some embodiments the ring field 124 and region 130 may be characterized as an oblate, oblong, or elongated annulus or field. By providing ring field 124 the transmitted beam 20 can be reflected in better overlap therewith, so as to provide better image quality.

It is thought that the present invention and many of the attendant advantages thereof will be understood from the foregoing description and it will be apparent that various changes may be made in the parts thereof without departing from the spirit and scope of the invention or sacrificing all of its material advantages, the forms hereinbefore described being merely exemplary embodiments thereof.

What is claimed is:

1. An imaging system comprising:
    a laser source situated to emit an input light beam and having a predetermined intensity profile across at least one axis perpendicular to a propagation axis of the input light beam;
    a mask disposed in relation to the input light beam so that selected portions of the input light beam are directed through the mask; and
    an optical relay situated to receive the selected portions of the input light beam in an elongate bilaterally symmetric and rotationally asymmetric ring field of reduced aberration of the optical relay, including at least one reflective aspheric surface, so as to reflect the selected portions of the input light beam to a target.

2. The imaging system of claim 1, wherein said mask is configured to transmit portions of the input light beam therethrough and to reflect non-transmitted portions away from said mask and said optical relay.

3. The imaging system of claim 2 wherein said mask is non-perpendicular to the propagation axis of the input light beam such that the non-transmitted portions of the input laser beam are reflected at said mask away from the propagation axis of the input light beam.

4. The imaging system of claim 1 wherein the input light beam has a power of 5 kW or greater.

5. The imaging system of claim 1 wherein the input light beam has a power of 10 kW or greater.

6. The imaging system of claim 1 wherein the input light beam has a power of 15 kW or greater.

7. The imaging system of claim 1 wherein said mask and said optical relay are maintained immovable relative to one another during operation.

8. The imaging system of claim 1 wherein the target is movable with respect to said optical relay.

9. The imaging system of claim 1, wherein said optical relay is situated so as to image the mask at the target with unit magnification.

10. The imaging system of claim 1, wherein said optical relay is situated so as to image the mask at the target with four times unit magnification.

11. The imaging system of claim 1, wherein the optical relay is situated to image at least a portion of the mask at the target.

12. The imaging system of claim 1 wherein said optical relay is a catadioptric relay.

13. The imaging system of claim 1 wherein said optical relay is a catoptric relay.

14. The imaging system of claim 1 wherein said optical relay is an Offner relay.

15. The imaging system of claim 1 wherein the target is a laser induced thermal imaging target.

16. The imaging system of claim 1 wherein the input light beam is a line beam with a length of 200 mm or greater.

17. The imaging system of claim 1 wherein the input light beam is a line beam with a length of 750 mm or greater.

18. A laser imaging system comprising:
    a light generating system for providing a light beam with a predetermined intensity distribution and total power of 2 kW or greater such that the light beam at a focus thereof has a narrow aspect ratio; and
    an off-axis reflective projection relay including a plurality of mirror elements with at least one having an aspheric surface, the relay disposed in relation to said light generating system and situated to receive the light beam in an elongate bilaterally symmetric and rotationally asymmetric ring field of reduced aberration of the reflective projection relay and to direct the light beam to an image location.

19. A laser system capable of emitting a line beam, the laser system comprising:
    a homogenizer optically coupled to an optical beam for homogenizing the optical beam across at least one transverse axis thereof; and
    a reflective relay optically coupled to said homogenizer for receiving the homogenized optical beam and optically imaging the homogenized optical beam to an imaging surface;
    wherein the reflective optical relay is a catoptric relay including a concave mirror and a convex mirror disposed in a concentric relation to one another, and a pair of turning mirrors disposed in relation to said concave mirror and said convex mirror and optically coupled to said concave mirror, said turning mirrors having non-planar aspheric surfaces and being mirror images of each other.

20. The laser system of claim 19 wherein the imaged homogenized optical beam is substantially free of optical aberration.

21. The laser system of claim 19 wherein said reflective relay includes first and second transmissive windows, said first window adapted to receive a diverging homogenized optical beam, said second window adapted to receive a converging homogenized optical beam.

22. The laser system of claim 19, wherein said reflective relay is an Offner relay.

23. The laser system of claim 19 wherein said reflective relay is a unit-magnification imaging relay.

24. The laser system of claim 19 wherein said reflective relay is self-corrected.

25. A laser imaging system comprising:
    an optical source that produces an input light beam;
    an optical mask optically coupled to said optical source, said mask situated to provide a patterned input light beam; and
    a reflective optical relay optically coupled to said mask, the reflective optical relay including a concave outer mirror and a convex inner mirror, the concave outer mirror being situated to receive the patterned input light beam in a first portion of an elongate bilaterally symmetric and rotationally asymmetric ring field of reduced aberration and to reflect the patterned input light beam so as to direct the patterned input light beam to the convex inner mirror, the convex inner mirror being situated to receive the patterned input light beam and to reflect the patterned input light beam to a second portion of the elongate bilaterally symmetric and rotationally asymmetric ring field of the concave outer mirror.

26. The laser imaging system of claim 25 wherein the ring field is an oblate annulus.

27. The laser imaging system of claim 25, wherein the first and second portions of the elongate symmetric ring field correspond to the elongated portions of the elongate symmetric ring field and wherein the input light beam is reflected substantially within the elongate symmetric ring field first and second portions.

28. A laser line beam system, comprising:
a plurality of diode laser modules providing plurality of output beams;
a cylindrical lens situated to receive the plurality of output beams and telecentrically focus the plurality of output beams;
a homogenizing light pipe situated to receive the focused plurality of output beams and configured to homogenize the output beams across one or more transverse axes into a single homogenized output line beam; and
an off-axis reflective relay including a concave mirror and a convex mirror situated in a non-concentric relation and having respective centers of curvature lying on a common system axis, the convex mirror having first and second surfaces and an internal portion, the first surface being anti-reflective so as to transmit light, the second surface being reflective so as to reflect light received through the internal portion, the off-axis reflective relay being situated to receive at least a portion of the homogenized output line beam in a first off-axis portion and configured to reflect the at least a portion of the homogenized output line beam from a second off-axis portion to a target.

29. The laser system of claim 28, wherein the concave mirror has an aspheric surface.

30. A laser induced thermally imaged surface formed by a method comprising:
generating an optical beam of 2 kW or greater and having an apodized intensity profile;
directing the optical beam to a mask such that a patterned optical beam is created; and
reflectively projecting the patterned optical beam through an elongate bilaterally symmetric and rotationally asymmetric ring field of reduced aberration of an optical relay having a to the laser induced thermally imaged surface.

31. An off-axis imaging relay comprising:
a concave mirror and a convex mirror disposed with respective centers of curvature situated on a common system axis in a non-concentric relation to one another;
said convex mirror having first and second surfaces and an internal portion, said first surface being anti-reflective coated so as to substantially transmit light incident thereon, said second surface being substantially reflective so as to reflect light incident thereon through said internal portion;
said concave mirror situated to receive light in a first off-axis region from an off-axis object plane and to direct the light to the convex mirror, the concave mirror also situated to receive the light from the convex mirror in a second off-axis region of the concave mirror so as to direct the light to an off-axis image plane.

32. The imaging relay of claim 31, wherein the concave mirror of said imaging relay has a non-planar aspheric surface.

33. A method of forming a laser induced thermally imaged surface, comprising:
generating an optical beam having a beam power of 2 kW or greater and having an apodized intensity profile;
directing the optical beam to a mask so as to produce a patterned optical beam; and
reflectively projecting the patterned optical beam through an optical relay having an elongate bilaterally symmetric and rotationally asymmetric ring field of reduced aberration to form the laser induced thermally imaged surface.

34. A method of processing materials with an optical line beam, the method comprising:
directing at least a portion of the optical line beam generated with one or more laser sources towards an off-axis reflective optical relay, the off-axis reflective optical relay including concave and convex mirrors having respective centers of curvature non-concentrically situated on a common axis, the concave mirror situated to receive light in a first off-axis portion and to direct light from a second off-axis portion, the convex mirror having first and second surfaces and an internal portion, the first surface being anti-reflective so as to transmit light, said second surface being reflective so as to reflect light through the internal portion;
reflecting the portion of the optical line beam through the reflective optical relay; and
imaging the portion of the optical line beam at unit magnification at a work surface.

35. A method of processing materials comprising:
emitting laser beams from a plurality of laser diode modules;
telecentrically imaging the laser beams into a beam homogenizer so as to form an homogenized beam having a power of 2 kW or greater;
directing the homogenized beam through a mask so as to form an output beam;
directing the output beam from an object plane through a reflective relay having a pair of non-planar aspheric turning mirrors; and
imaging the optical beam at unit magnification to an image plane at a work surface.

* * * * *